Sept. 6, 1960
A. J. ZABER
2,951,717
AIR DUCT COUPLING
Filed Aug. 16, 1957
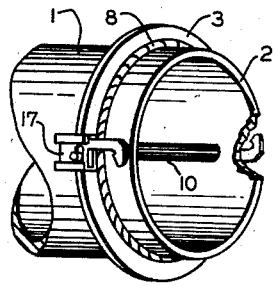
FIG. 1
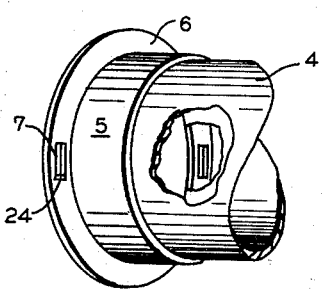
FIG. 2
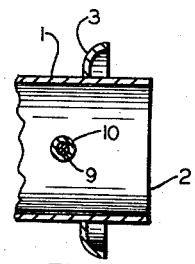
FIG. 8
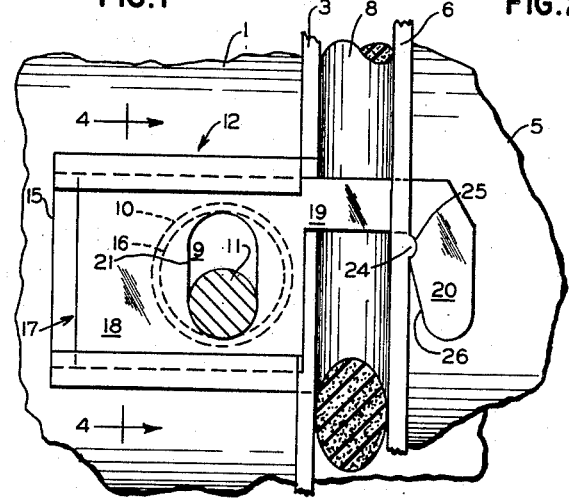
FIG. 3
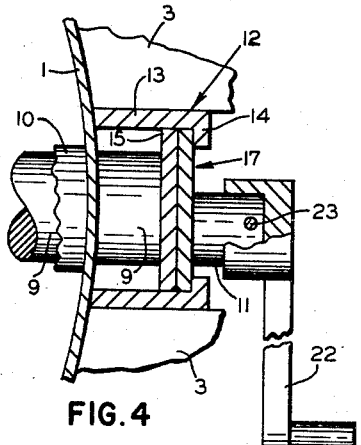
FIG. 4
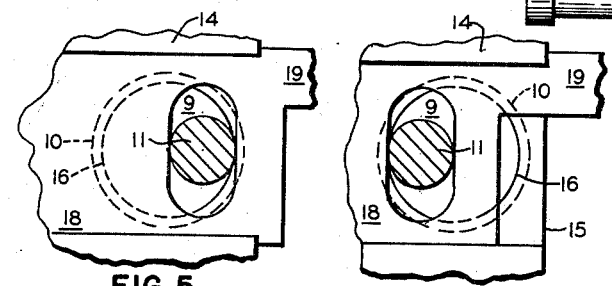
FIG. 5
FIG. 6
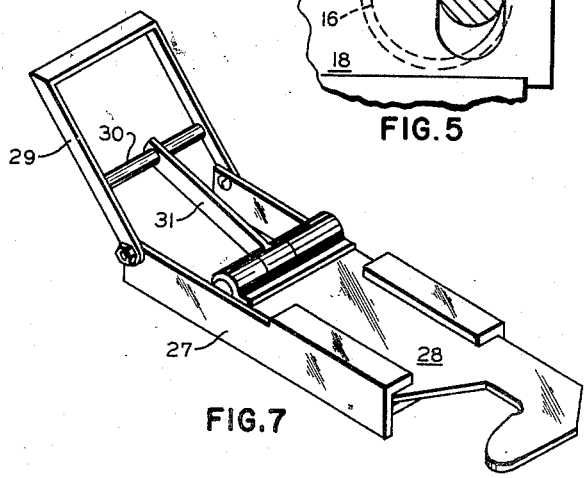
FIG. 7
*INVENTOR.*
ADOLPH J. ZABER
BY
*Edward C. Army*
ATTORNEY

United States Patent Office 2,951,717
Patented Sept. 6, 1960

2,951,717
AIR DUCT COUPLING

Adolph J. Zaber, Moline, Ill., assignor to American Air Filter Company, Inc., Louisville, Ky., a corporation of Delaware Filed Aug. 16, 1957, Ser. No. 678,669

3 Claims. (Cl. 285—311)

This invention relates to couplings, and relates in particular to a coupling arrangement for flexible ducts of the type used to convey relatively high pressure air from a source to a remote enclosure.

It is common practice to preheat jet engines of aircraft before attempting to start them in the colder climates. Additionally, with advanced aircraft having a great quantity of complex electronic equipment, it is also necessary to supply air to prevent the electronic equipment from overheating until the aircraft is in movement and can draw in sufficient atmospheric air for cooling. While in both cases the air is conveyed under at least a minimum pressure, in the latter case, it is particularly important to deliver the air with sufficient pressure to obtain circulation between the electronic components. This pressure may be as high as 5 pounds per square inch.

With air under a pressure of this order, the couplings for the conveying duct system must be air tight to prevent a substantial loss of air. The nature of the operation also requires that the coupling and uncoupling operation be accomplished quickly and positively.

Conventionally, the detachable couplings of the duct system have been of the type wherein the duct ends to be coupled are each provided with a peripheral flange, one peripheral flange carrying a pair of fixed, diametrically opposed claw-like members projecting axially away from the flange, and the other flange having a pair of corresponding slots which receive the projecting members. A compressible gasket is positioned between the flanges to effect the air tight seal when the ends are drawn up into a coupled relationship.

The duct ends are coupled by: axially aligning the opposing duct ends; aligning the claw members with the slots; moving the duct ends towards each other so that the extremity of the claw member projects through the cooperating slots of the opposing flange; and then rotating the one duct end relative to the other. In this rotational movement, an inclined inner edge of the hook-like extremity engages an edge of the slot so that the opposite rotational movement of the duct ends results in a simultaneous movement of the flanges axially towards each other. The gasket is of course compressed between the opposing inner faces of the flange by this movement of the flanges towards each other.

The resistance to escape of the air through these couplings is, for the most part, dependent upon the degree of compression of the gasket. Thus, the gaskets for high pressure air duct systems are made of material which requires a relatively high degree of force per unit area to compress the material. In this same connection, the gasket material must be compressed to a relatively high degree to minimize the possibility of blowing the gasket from between the flanges.

In the conventional type coupling described, where the compression of the gasket results from the axial movement effected by rotating one duct end relative to the other, it is difficult to apply sufficient rotational force to the duct ends to compress the gasket. This is due partly to the high resistance to compression of the gasket material, and due partly to the resistance to rotation of the duct ends resulting from the friction between the gasket and each of the opposing inner faces of the flanges engaged by the gasket.

Another reason for the difficulty experienced in the operation of coupling a pair of duct ends is that the duct ends are cylindrical in cross-section and no means for conveniently grasping the duct ends is provided. Furthermore, because of the extremely low temperatures prevailing in many areas where these units are used, the coupling and uncoupling operation must be accomplished with the operators wearing heavy mittens. This obviously makes the duct ends even more difficult to grasp to apply the rotational force.

Since the forces resisting the coupling operation increase as the gasket becomes compressed to an increasing degree, some operators fail to continue the rotational motion to the point where the claw member locks with the opposing flange. This may result in the duct ends appearing to be sealably coupled whereas in fact they are only physically coupled. Thus, upon initiating high pressure air flow through the ducts, the gasket may be blown out and the connection become uncoupled. As a result, the unattached end of the duct discharging high pressure air may flail about and strike anything in the vicinity—much the same as with an unsecured water hose carrying water under high pressure.

An object of the present invention is to provide an improved, releasable coupling arrangement for ducts carrying relatively high pressure air.

Another object is the provision of the coupling arrangement which permits a pair of duct ends to be rapidly and easily coupled or uncoupled, and which results in a high degree of compressive force being exerted upon the sealing gasket.

A further object is the provision of a coupling in which, if a gasket should be blown, the likelihood that the coupled sections will become detached is minimized.

Briefly, my invention contemplates the provision of latches which may be moved relative to the duct end and peripheral flange mounted thereon. The latches are displaceable between: an extended position in which their claw-like extremities extend beyond strike means, which may be the remote face of the peripheral flange mounted on the opposing duct end and, in which position the gasket is substantially uncompressed; and a retracted position in which the claw-like extremities engage the strike means with a substantial force and hold the gasket in a state of compression between the opposing inner faces of the flanges.

I provide track means or guideways for carrying the displaceable latches and mount the track means so that the latches are directed along a particular path in their displacement, thus insuring that the latches may be conveniently aligned with the strike means on the opposing duct end. Lever means providing a mechanical advantage are arranged to effect the displacement of the latches without the application of an inordinate amount of force.

In one embodiment of my invention, the diametrically opposed latches may be arranged to operate simultaneously in the coupling or the uncoupling operation, this being accomplished by utilizing a diametrically disposed shaft having offset projections at its ends which engage slots in the latches. In this embodiment a handle, connected to one of the offset projections of the shaft, is used to operate the latches.

In another embodiment, the latches may be mounted and arranged to be operated independently of each other.

An embodiment of the invention is illustrated in the accompanying drawing wherein:

Figure 1 is a fragmentary perspective view showing an air source outlet port embodying one form of the invention, this view having the operating handle deleted for clarity;

Figure 2 is a partly broken fragmentary perspective showing the mating duct end adapted to be coupled to the outlet port of Figure 1;

Figure 3 is a fragmentary elevational view showing a latch in half-retracted position, and showing a portion of the gasket in a partly compressed condition;

Figure 4 is a sectional view taken along a line corresponding to line 4—4 of Figure 3, this view showing a partly broken handle for operating the latches;

Figure 5 is a fragmentary elevational view similar to Figure 3, this view showing the relative positions of the latch and the operating shaft when the latch is in a fully extended position;

Figure 6 is a fragmentary elevational view as in Figure 5, but showing the relative positions of the latch and the operating shaft when the latch is in its fully retracted position;

Figure 7 is a perspective view of a modified latch and its operating means, this latching arrangement being particularly suitable for certain applications;

Figure 8 is a vertical sectional view through an outlet end of a duct provided with a modified peripheral flange of a preferred type.

Referring to Figures 1 and 2, the air source outlet port is in the form of a cylindrical metal shell 1, connected on one end to receive air from the heater or blower (not shown) and terminating on the other end in a rim 2. A peripheral flange 3, spaced from the rim 2, is sealably secured to and encircles the shell. A fabric duct 4, made of any suitable air impervious material of a flexible nature, receives the air discharged from the outlet port when coupled thereto.

The inlet end of duct 4 is provided with a cylindrical metal shell 5 joined to the fabric along a sealed joint, the inner circumference of the shell 5 being slightly greater than the outer circumference of shell 1 so that the rim 2 and end portion of shell 1 may be telescopically received within shell 5.

The inlet duct end is provided with a peripheral flange 6 having a pair of diametrically opposed slots 7 of rectangular shape. A compressible gasket 8, in the form of an annular ring of circular cross section, is seated on the circumference of shell 1 and against the face of flange 3.

Referring again to Figure 1 at diametrically opposite points in the wall of shell 1, openings are provided to accommodate shaft 9 which is disposed diametrically across the interior of the shell. The shaft 9 is disposed coaxially within a tube 10 which is suitably secured and sealed at its ends to the inner surface of shell 1 to prevent any air from escaping through the openings in the shell.

The shaft 9 projects through the wall of shell 1 and is provided at each end with an outwardly projecting crank end 11 of smaller diameter than the shaft and having an axis offset from the axis of the shaft. Each crank end 11 is aligned with the other so that they occupy corresponding positions.

The track means (Figures 1, 3–4) for each latch is provided by a pair of plates, generally designated 12, which are L-shaped in cross section and which are secured, in spaced apart relationship, along one longitudinal edge of their leg portion 13 to the shell 1. The plates are mounted so that their toes 14 are directed inwardly or towards each other. A flat plate 15 is secured along its opposite longitudinal edges to legs 13 and is spaced radially inwardly from the toes 14 to provide a guideway which accommodates a latch. A circular opening 16 in plate 15 receives and journals the end of shaft 9.

One latch 17 is slidably mounted in each guideway. Each latch has a rectangular body portion 18, an extended neck portion 19 and a laterally directed hook or claw 20 at the end of the neck. The longitudinal marginal edges of the latch are slidably confined within the guideway formed by the plate 15 and the L-shaped plates 12 so that the latch may be displaced in an axial direction. Rectangular cut-outs to accommodate the movement of the latches are provided in flange 3.

The body portion 18 of each latch is provided with an elongated slot 21 having its longitudinal axis parallel to the peripheral flange 3. The width of the slot is equal to or slightly larger than the diameter of the crank ends 11, and the ends of the slot are in semi-circular form with a diameter equal to the width of the slot. The length of the slot is such that the circumference of the crank ends 11 will not bind against the slot ends in the rotational movement of the ends. One of the crank ends 11 projects outwardly a sufficient distance beyond the latch 17 to accommodate the securement of a handle 22 by means of a key or pin 23 which extends through the hub and crank end.

It will be apparent that since the width of slot 21 is less than the diameter of the shaft 9, that portion of the shaft end which does not have a projecting crank will abut the inner face of the latch. This prevents endwise movement of the shaft.

In the embodiment of Figures 1, 3–4, the sliding movement of the latches within the guideway is effected by rotating the shaft 9 and crank ends 11 by means of handle 22. In this operation, a portion of the circumference of crank ends 11 engages the edges of slots 21 and thus converts the rotational force exerted to an axial force which moves the latches in one direction or the other. In passing, it is to be noted that since the crank ends are aligned, the latches will occupy corresponding positions relative to the flange.

In Figure 5, the position of the latch relative to the axis of shaft 9 with the handle 22 turned 90 degrees counter-clockwise from the position in Figure 3 is shown; this rotated position corresponding to the latches being in an extended position, or with the claw-like extremities 20 projecting the maximum distance away from the flange 3. Figure 6 shows the position of the latch relative to the axis of shaft 9 when the handle has been turned 90 degrees clockwise from the position of Figure 3, this rotated position corresponding to the latches being fully retracted. As will be apparent from the drawing, the maximum axial movement of the latches is equal to twice the distance between the axis of the shaft 9 and the axis of the crank end 11.

The first step in the coupling operation is accomplished by axially aligning the opposing duct ends and rotating one relative to the other until the latches are aligned with the slots 7. The duct ends are then moved towards each other until the claw portions 20 of the latches extend beyond the remote face of slotted flange 6. The inlet duct end is then rotated slightly in a clockwise direction (as seen in Figure 2) until the lower edge of neck 19 contacts the end edge of the slot 7.

It will be noted that the end edge of slot 7 which, upon rotation of the inlet duct end in the coupling operation, contacts the edge of neck 19, is provided with a raised lip 24 on the remote face of the slotted flange 6. This lip is adapted to cooperate with a small notch 25 in the claw portion 20 to lock the flange 6 in a position where it cannot be rotated without being first disengaged. The claw portion is also provided with an inner edge 26 which is inclined relative to the plane in which the flange 6 lies when coupled. By means of this arrangement any substantial compression of the gasket is avoided in the coupling operation until the inlet duct end has been rotated to the point where lip 24 locks with notch 25.

The diameter of the gasket 8 is dimensioned so that with the latches fully extended (as shown in Figure 5), the inlet duct end may be physically coupled (as distinguished from sealably coupled) to the outlet port without substantially compressing the gasket.

To sealably couple the ends after they are physically coupled with the latches in their extended position, the handle 22 is turned 180°. This causes the latches to draw the slotted flange 6 towards the flange 3 and thereby compresses the gasket therebetween.

The embodiment of Figure 7 shows another arrangement for operating the latches. In this modification, the plates 27 which provide the guideway for the latches 28 are extended somewhat along the shell circumference. A U-shaped lever 29 is pivotally secured to the extended ends of the plate 27 and a cross bar 30 mounted between the side of the lever. A crankshaft-like member 31 is pivotally connected at one end to the cross bar, and at its other end to the rear edge of the latch 28. One of these latch assemblies is mounted on each of opposite sides of a duct end. Each latch 29 cooperates with a slotted flange of an opposing duct end of Figure 2.

The lever 29 is pivotally secured near the radially outer edge of plate 27 so that the crankshaft 31 will have its end which is connected to bar 30 closer to the axis of the duct ends than the end connected to the latch when the lever 29 is rotated to a position which retracts the latch 28. This locks the latch 28 in a retracted position.

While the coupling arrangement shown has flanges which extend radially outwardly beyond a point necessary to provide a seat for the gasket, thus permitting the use of the flange 6 as the strike plate or strike means against which the claw portion of the latch engages, it is to be noted that the strike means may be, for example, in the form of tab-like projections extending radially from flange 6, or as members separate from the flange.

In the modification shown in Figure 8, the flange 3 of the air outlet port is rolled or provided with a forwardly projecting circumferential marginal portion. Thus, when the ends are coupled, an annular chamber is formed between the opposing flanges to confine the gasket. This chamber serves to minimize the possibility of distension of the gasket member when high pressure air is conveyed through the duct system.

Having described my invention, I claim:

1. A coupling arrangement for air ducts of the type used with portable forced air heaters, comprising: a male duct end carrying a first peripheral flange spaced from the rim of said male duct end; a female duct end adapted to telescopically receive said male duct end, said female duct end carrying a second peripheral flange at its extremity; compressible gasket means disposed between the opposing faces of said first and second flanges; guideway means providing axially extending tracks at diametrically opposite external locations on said male duct end; latch means including a transversely slotted body portion slidably carried for movement in an axial direction only in each of said guideway means, and a claw-like extremity projecting tangentially with respect to the axis of said duct and having an inclined inner edge portion, said claw-like extremities of opposite latch means projecting in opposite directions; aperture-like slot means in said second peripheral flange to receive said claw-like extremity therethrough; and latch operating means including a shaft passing diametrically and in air sealing relationship through said male duct end for engagement with said slotted body portion of said latch means, said shaft being rotatably operable to displace said latch means to an extended position permitting said duct ends to be mechanically coupled by moving said duct ends axially towards each other and rotating one relative to the other, the outer side of said second flange and the inner end of said extremity comprising means maintaining said side and said inner end in abutment while being moved axially towards each other, and rotatably operable to displace said latch means to a retracted position for sealably compressing said gasket means between said flanges.

2. The coupling arrangement of claim 1 wherein; at least one of said peripheral flanges has its outer marginal edge directed towards the opposing flange to form therewith an annular chamber for confining said gasket.

3. The coupling arrangement of claim 1 including: a raised lip on said outer side of said second flange adjacent the edge of said slot means; and, a lip receiving notch on said inclined inner edge portion of said claw-like extremity, said lip and notch being disposed to cooperate to lock said duct ends in a non-rotatable position relative to each other.

References Cited in the file of this patent

UNITED STATES PATENTS

| 694,422 | Robertson | Mar. 4, 1902 |
| 807,417 | Caskey | Dec. 12, 1905 |
| 897,105 | Ingebo | Aug. 25, 1908 |
| 1,220,868 | McSwain | Mar. 27, 1917 |
| 1,233,168 | Berry | July 10, 1917 |
| 1,233,169 | Berry | July 10, 1917 |
| 1,233,170 | Berry | July 10, 1917 |
| 2,784,019 | Des Combes | Mar. 5, 1957 |

FOREIGN PATENTS

| 219,675 | Great Britain | Oct. 8, 1925 |
| 267,519 | Italy | Sept. 10, 1929 |
| 648,161 | Germany | Feb. 4, 1933 |
| 77,021 | Norway | June 19, 1950 |